United States Patent [19]

Thirion de Briel

[11] 4,365,963

[45] Dec. 28, 1982

[54] SPEED CHANGE PULLEY

[75] Inventor: Jacques J. M. Thirion de Briel, Levallois-Perret, France

[73] Assignee: Societe Anonyme Francaise du Ferodo, Paris, France

[21] Appl. No.: 54,407

[22] Filed: Jul. 3, 1979

[30] Foreign Application Priority Data

May 7, 1978 [FR] France ............................ 78 20025

[51] Int. Cl.³ .............................................. F16H 11/06
[52] U.S. Cl. ........................................ 474/13; 474/46
[58] Field of Search .............................. 474/13, 14, 46

[56] References Cited

U.S. PATENT DOCUMENTS

| 2,256,699 | 9/1941 | Almen | 474/13 |
| 2,289,573 | 7/1942 | Almen | 474/46 X |
| 3,727,476 | 4/1973 | Heidorn | 474/46 X |
| 3,910,129 | 10/1975 | Phillips | 474/46 |
| 3,961,538 | 6/1976 | Phillips | 474/46 |
| 4,020,711 | 5/1977 | Woollard | 474/13 |
| 4,132,120 | 1/1979 | Fénart | 474/13 |
| 4,137,786 | 2/1979 | Fénart | 474/13 |
| 4,147,068 | 4/1979 | Woollard et al. | 474/13 |
| 4,178,808 | 12/1979 | Bacher | 474/13 |

FOREIGN PATENT DOCUMENTS

| 1283024 | 12/1961 | France . | |
| 2060836 | 6/1971 | France . | |
| 1456796 | 11/1976 | United Kingdom | 474/14 |

Primary Examiner—C. J. Husar
Assistant Examiner—Conrad L. Berman
Attorney, Agent, or Firm—Charles E. Brown

[57] ABSTRACT

A speed change pulley is disclosed in which, for relative centering of the movable side plate with respect to the diaphragm, the diaphragm is provided with engagement members projecting therefrom and axially received in notches in the movable side plate. The engagement members also comprise weight members for enhanced sensitivity to centrifugal force.

22 Claims, 16 Drawing Figures

SPEED CHANGE PULLEY

FIELD OF THE INVENTION

The present invention relates to speed change pulleys.

BACKGROUND OF THE INVENTION

U.S. Pat. No. 4,132,120 describes a speed change pulley of the type comprising two oppositely and coaxially disposed side plates each having a frustoconical portion; one of the side plates is a movable side plate, under the bias of resilient return means and axially movable opposite the other side plate, or fixed side plate. The resilient return means comprises an annular member or diaphragm, having a peripheral portion which forms a resilient washer of the Belleville washer type which abuts against the movable side plate, and a central portion which is divided by slots into radial fingers which abuts against a component axially fast with the fixed side plate. Engagement means are provided on the diaphragm for cooperation with complementary opening means provided on the movable side plate, and comprise at least one engagement member forming a component formed separately from the diaphragm and suitably fitted thereon.

The essential function of such engagement members is to allow the relative centering of the movable side plate and the diaphragm with respect to each other without necessitating any local change in shape of the diaphragm which may lessen the strength thereof, increasing the diameter thereof. However, they may also function to allow the driving of the movable side plate in rotation by the diaphragm.

SUMMARY OF THE INVENTION

An object of the invention is to provide various embodiments of such engagement members enabling additional advantages to be derived therefrom.

In particular, as the diaphragm usually comprises at least one flyweight or weight member projecting therefrom, adapted to increase its sensitivity to the centrifugal speed, it is proposed, according to the present invention, to associate such a weight member with an engagement member, to combine these two members to be fitted to the diaphragm.

Thus, according to the invention, at least one of the engagement members is fast with a weight member.

According to a first embodiment, such an engagement member comprises, in one piece, an extension forming a weight member, this extension being in practice offset axially with respect to the radial portion of this engagement member which is in contact with the diaphragm, hereinafter called the abutment member.

In a variant according to a second embodiment, at least one of the engagement members is carried by a weight member offset axially with respect to the diaphragm, such an engagement member then forming, in practice, a radial extension of such a weight member.

In both embodiments, the same member economically performs a dual function, which is to constitute both an engagement member and a weight member, this advantageously reducing the manufacturing and assembly costs.

It is true that French printed patent specification No. 2,060,836 proposes to locally reinforce a diaphragm by fitting it with elements which are of sufficient radially extent to allow torque transmission between the diaphragm and the movable side plate.

However, such elements are rectilinear, without a portion axially spaced from the diaphragm, and are therefore not in a position to efficiently perform the function of the weight member.

The same applies to French Pat. No. 1,283,024 in which, in addition, the elements in question equip a simple annular washer and their purpose is simply to constitute therefor radially extending fingers adapted to form a diaphragm.

According to the invention, the corresponding elements constitute real weight members, by their axial spacing or offsetting with respect to the diaphragm.

In addition, according to a particular embodiment of the present invention, at least one of the engagement members comprises hook-like fastening means, for example, a fastening shank adapted to mesh with complementary fastening means provided on the movable side plate. For example, in an opening, said fastening shank may mesh, for coupling, in a first axial direction, with the peripheral portion of the diaphragm to the movable side plate when the latter is in a remote position with respect to the fixed side plate. Spacer means are provided between the central portion of the diaphragm and the movable side plate, for example an abutment projection provided in substantially axial projection on at least one weight member, or a tongue cut out from the movable side plate and folded substantially axially in the direction of the diaphragm, for abutment, in the opposite axial direction, with the central portion of the diaphragm on the movable side plate for said remote position of the same.

This disposition makes it possible to avoid turning of the diaphragm when the movable side plate is spaced from the fixed side plate: the fastening means used avoids a loss of contact between the diaphragm and the movable side plate, and, together therewith, the spacer means avoids loss of contact between the diaphragm and the abutment member, on which these radial fingers bear.

Thus, according to this arrangement, the engagement members then perform a supplementary function, that of coupling the diaphragm to the movable side plate for the spaced position thereof.

The invention will be more readily understood on reading the following description with reference to the accompanying drawings.

DETAILED DESCRIPTION OF THE PREFERRED EMBODIMENTS

Figure 1:
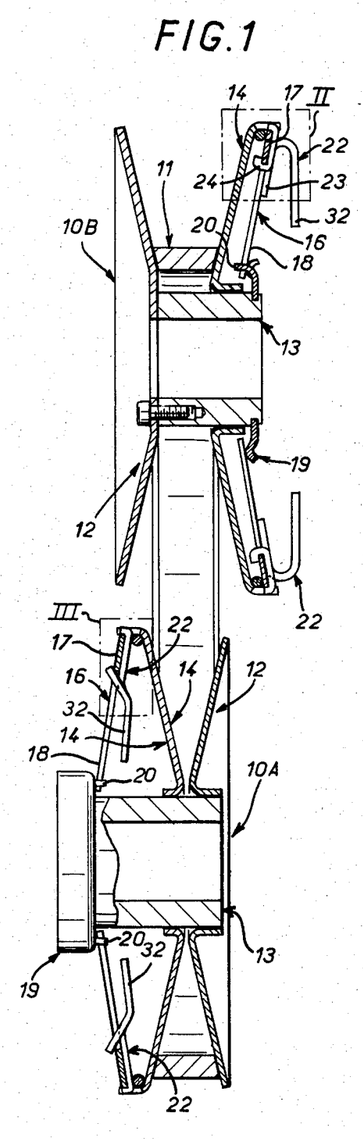
FIG. 1 is a view in axial section through a speed change device equipped with pulleys according to the invention.

Referring now to the drawings, FIG. 1 shows a speed change device substantially comprising, as conventional, a driving pulley 10A, a driven pulley 10B, and an endless V-belt 11 of trapezoidal section received by these pulleys.

The pulleys 10A, 10B are substantially of the similar construction: they each comprise two coaxial side plates with frustoconical portions disposed opposite each other.

There is first a side plate 12, referred to as the fixed side plate, carried by a sleeve 13, and fast therewith, in a manner well known per se, which will not be described in detail here as its details are not part of the invention.

The sleeve 13 is intended to be fitted to a shaft (not shown) which, in practice, for the driving pulley 10A, is a driving shaft, and which, for the driven pulley 10B, is a shaft to be driven.

Side plate 14, referred to as the movable side plate, which, under the bias of resilient return means described in detail hereinafter, is mounted to move axially with respect to the fixed side plate 12.

In the illustrated embodiment, the movable side plate 14 is slidably engaged on the sleeve 13. However, this is not necessarily so. Whatever the case may be, the resilient return means associated with this movable side plate 14 comprises an annular member 16, referred to as the diaphragm spring or simply the diaphragm, having, on the one hand, a peripheral portion 17 which forms a resilient washer of the Belleville type and which abuts axially against the movable side plate 14, and a central portion 18, which is divided by slots into radially extending fingers and which abuts against a member 19, called the abutment member. The abutment member is axially fast with respect to the fixed side plate 12 and, for example, as shown, fitted on the sleeve 13 at the end thereof opposite the one carrying the fixed side plate 12.

Owing to axial fingers 20 each being individually engaged in the slots of the central portion 18 of the diaphragm 16, the abutment member 19 associated therewith ensures the rotational driving thereof.

Such arrangements are well known per se, and they are described in detail in particular in U.S. Pat. No. 4,132,120. They will not be described in greater detail herein.

For relative centering of the movable side plate 14 and the diaphragm 16 with respect to each other, engagement means are provided on the diaphragm 16, for cooperation with complementary opening means provided on the movable side plate. As shown in U.S. Pat. No. 4,132,120, such engagement means comprise a plurality of engagement members 22 distributed circumferentially on the peripheral portion 17 of the diaphragm 16, projecting substantially axially thereon, and forming components which, formed separately from the diaphragm 16, are suitably fitted thereon.

Figure 2:
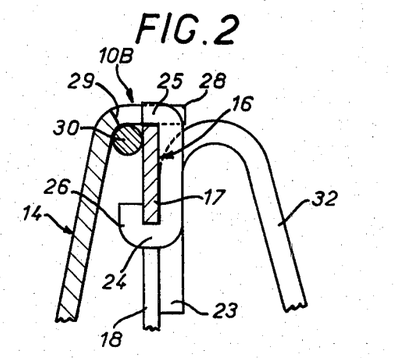
FIGS. 2 and 3 are views respectively showing, on a larger scale, the parts of FIG. 1, enclosed within insets II, III therein, for a configuration of the corresponding diaphragm which is assumed to be flat.
Figure 2B:
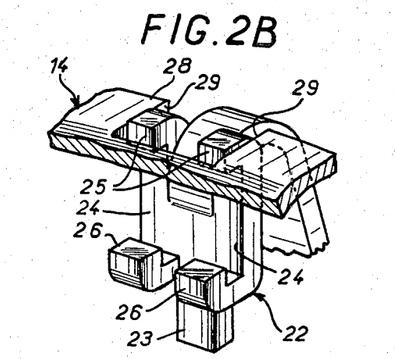
FIG. 2B is a partial view in perspective, with parts cutaway, of the components shown in FIG. 2.

In the case for example of the driven pulley 10B, and in the embodiment shown in FIGS. 1, 2 and 2B, such an engagement member 22 comprises, in its median zone, a radially extending portion 23, called the radial abutment portion. Over at least a part of its length the radial abutment portion is in contact with the peripheral portion 17 of the diaphragm 16. On each side of this abutment portion 23, a lateral part 24 is hooked on the peripheral portion 17 of the diaphragm 16.

In the embodiment shown, each of the lateral portions 24 comprises, at its radially outer end, a right angle bent portion 25, by which it is simply in abutment on the edge of the peripheral portion 17 of the diaphragm 16 and, at its radial inner end, a U-bent portion 26 by which it passes through the diaphragm 16, via one of the passages that the diaphragm 16 usually comprises at the base of the slots of its central portion 18, for abutment on the opposite face of said diaphragm.

In the embodiment sown in FIGS. 1, 2 and 2B, the radial abutment portion 23 of an engagement member 22 extends on the other side of the diaphragm 16 with respect to the movable side plate 14.

As described in the above patent, the movable side plate 14 is axially engaged on the engagement members 22 carried by the diaphragm 16.

To this end, in the embodiment shown in FIGS. 1, 2 and 2B, the movable side plate 14 is, on its outer periphery, provided with a substantially axial rim 28 having, at spaced locations, in registry with the engagement members 22, opening means or notches 29 by each of which it is engaged with the opposite sides of the lateral portions 24 of such an engagement member 22.

In the embodiments shown, the peripheral portion 17 of the diaphragm 16 is in axial abutment against the movable side plate 14 through a ring 30 disposed in the zone of connection between the side of this side plate and its axial rim 28.

The diaphragm 16 usually has at least one flyweight or weight member projecting therefrom, adapted to increase its sensitivity to the centrifugal speed.

According to one of the features of the invention, at least one of the engagement members 22 and, in practice, each of them, is fast with a weight member and for example, as shown in FIGS. 1 to 10, it comprises to this end, integral therewith, an extension 32 forming a weight member.

In order to be efficient, such an extension 32 forming a weight member is axially spaced from the radial abutment portion 23 of the engagement member 22 in question, and therefore from the diaphragm 16.

In the case of the driven pulley 10B, this extension 32 is on the other side of the diaphragm 16 with respect to the movable side plate 14.

In the embodiment illustrated in FIGS. 1, 2 and 2B, it therefore extends on the same side of the diaphragm 16 as the radial abutment portion 23 of the engagement member 22 to which it belongs, and it is in the form of a crook, one of the arms of this crook which together form said radial abutment portion 23.

In the case of the driving pulley 10A, the extension 32 forming weight member of an engagement member 22 extends on the same side of the diaphragm 16 as the movable side plate 14.

Figure 3:
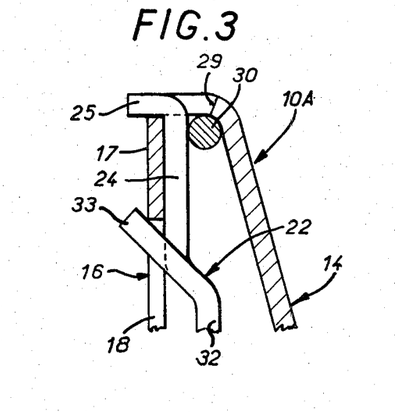

In the embodiment illustrated in FIG. 3, the lateral portions 24 of an engagement member 22 form the radial abutment portion thereof, the latter extends on the same side of the diaphragm 16 as the movable side plate 14, and the extension 32 axially spaced from the diaphragm 16 therefore extends on the same side thereof as this radial abutment portion. Between the lateral portions 24, the extension 32 forms a tongue 33 which extends substantially obliquely with respect to said lateral portions 24, and which passes through the diaphragm 16 via the corresponding passage therein.

Due to its obliqueness, this tongue 33 suffices to maintain the engagement member 22 in cooperation with the right angle bent portions 25 of the lateral portions thereof; it is not necessary for this tongue 33 to be folded in contact with the peripheral portion 17 of the diaphragm 16; it suffices that it is in contact with the latter by the edge of the opening that it passes through, as shown.

As will be noted, in the embodiment shown in FIG. 3, the peripheral portion 17 of the diaphragm 16 is in axial abutment against the movable side plate 14 through a ring 30 and engagement members 22, the radial abutment portion thereof, constituted by their lateral portions 24, extending on the same side of the diaphragm 16 as the movable side plate 14.

As a result, the engagement members 22 constitute, for the diaphragm, wear parts adapted to be fitted thereon.

Figure 4:
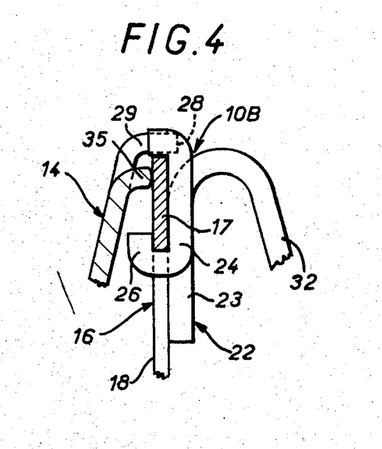
FIGS. 4, 5, 6 and 7 are views similar to that of FIG. 2 and each view shows an alternative embodiment.

The embodiment illustrated in FIG. 4 is similar to that illustrated in FIG. 2, except that, for axial abutment of the peripheral portion 17 of the diaphragm 16, the movable side plate 14 comprises lugs 35 formed by means of the opening means or notches 29 through which it is engaged on the engagement members 22. In this case these lugs 35 come directly into contact with the diaphragm 16. The ends of these lugs 35 are preferably rounded, as shown.

Figure 5:
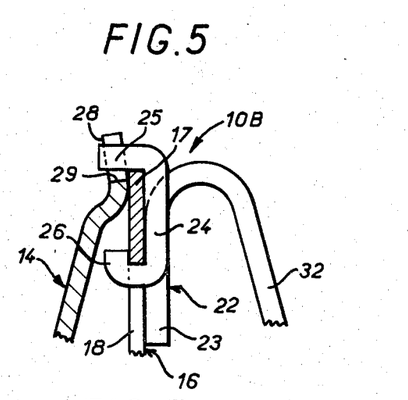

As a variant, shown in FIG. 5, for axial abutment of the peripheral portion 17 of the diaphragm 16, the movable side plate 14 peripherally comprises a rim 28 which is not substantially axial, as before, but, in this embodiment, its axial section is substantially rounded.

For engagement of this rim 28, by its opening means 29, on the engagement member 22, the right angle bent portion 25 of the lateral portions 24 extends considerably widely beyond the peripheral portion 17 of the diaphragm 16.

Figure 6:
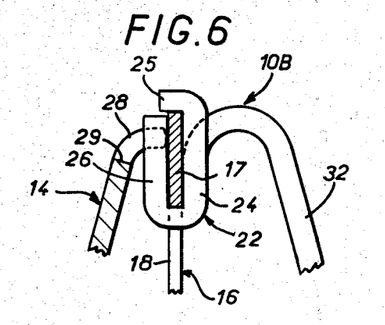

In the embodiment shown in FIG. 6, which is also similar to that of FIG. 2, the movable side plate 14 is, by the opening means 29 of its rim 28, axially engaged not on the right angle bent portions 25 of the lateral portions 24 of the engagement members 22, but on the U-bent portions 26 of these lateral portions 24, which are sufficiently extended radially for this purpose. In combination therewith, the axial abutment of the peripheral portion 17 of the diaphragm 16 on the movable side plate 14 is effected directly on the edge of the rim 28 thereof, between the engagement members 22. This edge is preferably rounded, as shown.

Figure 7:
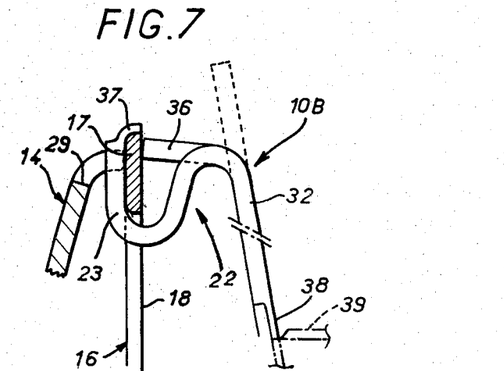

According to the embodiment illustrated in FIG. 7, which, like the preceding ones, relates to the driven pulley 10B, the extension 32 forming a weight member of an engagement member 22, which is generally in the form of a crook, extends on the other side of the diaphragm 16 with respect to the corresponding radial abutment portion 23, and comprises a tongue 36 in abutment against the diaphragm 16 on said other side thereof.

Initially, and as shown schematically in broken lines in FIG. 7, this tongue 36, which is formed by means of a slash made in the extension 32, is in the plane of the latter. On assembly, it is folded in contact with the diaphragm 16, as shown in solid lines in FIG. 7.

This tongue 36 therefore suffices to maintain the engagement member 22 in question in cooperation with an angle portion 37 at the end of the radial abutment portion 23 for cooperation with the edge of the peripheral portion 17 of the diaphragm 16.

As illustrated in FIG. 7, the end of the extension 32 of an engagement member 22 may advantageously be of reduced thickness and form a tongue 38 by which such an engagement member is initially fixed radially to a ring common to all the engagement members. The tongue 38 is severed from this ring, for example by means of a cutting tool 39, as shown schematically in broken lines in FIG. 7, after assembly on the diaphragm 16 and in particular after the folding of the tongues 36 into contact with this diaphragm, as explained hereinabove.

This arrangement may be applied to the other embodiments of the engagement members according to the invention, facilitates the positioning of the latter on the diaphragm 16.

Figure 8:
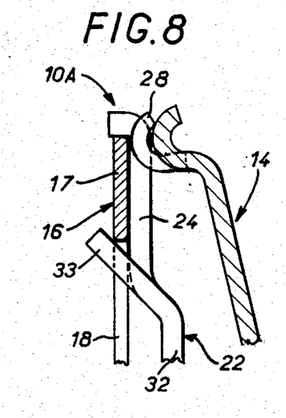
FIGS. 8, 9 and 10 are views respectively similar to that of FIG. 3 and each view shows an alternative embodiment.
Figure 9:
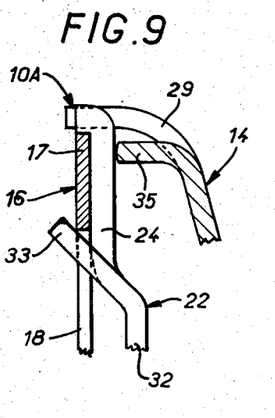

In the case of the driving pulley 10A, the embodiments illustrated in FIGS. 8 and 9 are similar to the embodiment of FIG. 3, except that, in FIG. 8, for axial abutment of the diaphragm 16, the movable side plate 14 comprises a rim 28 of rounded axial section. In FIG. 9, for said axial abutment of the diaphragm 16, the movable side plate 14 comprises lugs 35 formed by its opening means or notches 29 and having rounded ends.

Figure 10:
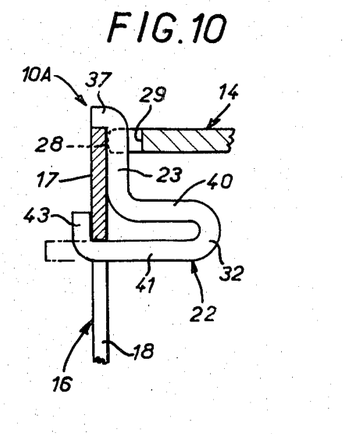

According to the embodiment illustrated in FIG. 10, relative to the driving pulley 10A, also adapted for the driven pulley 10B, the extension 32 forming weight member of an engagement member 22 has the form of a U. One of the arms 40 of the U is in continuity with the radial abutment portion 23 of this engagement member, making an angle therewith, and in practice a substantially right angle, as shown. The other arm 41 of the U passes through the diaphragm 16 through a corresponding passage therein and its end 43, which is initially in its plane, as shown schematically in broken lines in FIG. 10, is bent at right angles in contact with the diaphragm 16.

Together with an angle portion 37 on the radial abutment portion 23 for cooperation with the edge of the peripheral portion 17 of the diaphragm 16, this end 43, bent at right angles, of the engagement member 22 suffices to hold the latter.

Whatever the embodiment of the engagement members 22, the operation of the speed change pulley according to the invention remains the same as that described in U.S. Pat. No. 4,132,120.

Its operation will only be briefly reiterated here: In the rest position, the belt 11 assumes a position in which it runs along a large diameter of the driving pulley 10A and a small diameter of driven pulley 10B (FIG. 1), the movable side plate 14 of the driving pulley 10A being close to the fixed side plate 12 thereof, whilst the movable side plate 14 of the driven pulley 10B is in a spaced or remote position with respect to the fixed side plate 12 of the driven pulley 10B.

As the speed of rotation of the driving pulley 10A increases, the belt 11 with respect to the pulleys 10A, 10B changes to a configuration in which it runs along a small diameter of the driving pulley 10A and a large diameter of the driven pulley 10B. The movable side plate 14 of the driving pulley 10A progressively passes from its close position to its remote position with respect to the corresponding fixed side plate and, at the same time, the movable side plate 14 of the driven pulley 10B progressively passes from its remote position to its close position with respect to the corresponding fixed side plate 12.

The transmission ratio between these pulleys therefore changes accordingly.

As the speed of rotation of the driving pulley 10A decreases, the diaphragm 16 as a whole resumes its initial configuration.

Figures 11A, 12:
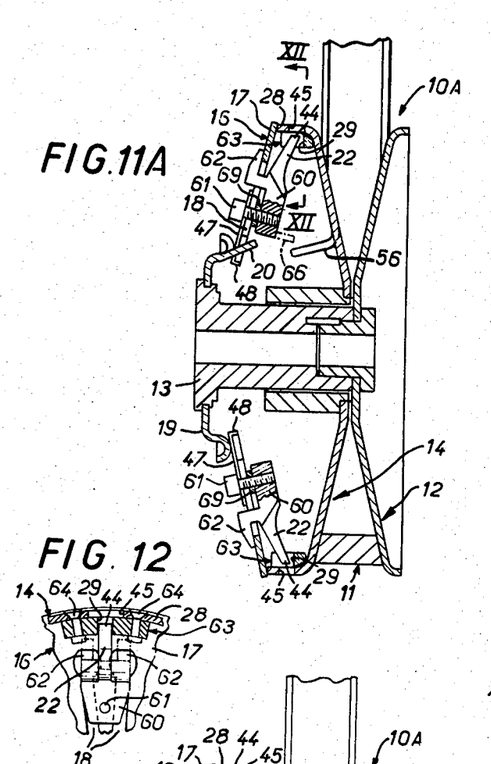
FIG. 11A is a view in axial section of an alternative embodiment of a pulley according to the invention in which the movable side plate is in its position close to the associated fixed side plate.
FIG. 12 is a partial view in transverse section of the embodiment shown in FIGS. 11A, 11B.
Figure 11B:
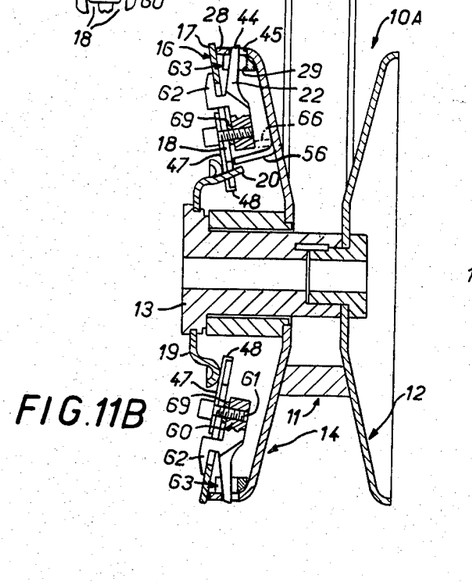
FIG. 11B is a view similar to that of FIG. 11A, for the position of the movable side plate for which it is remote from the fixed side plate.

According to the embodiment shown in FIGS. 11A and 11B, arrangements are made, so that in the remote position of the movable side plate 14 of a pulley with respect to the fixed side plate 12 thereof, the corresponding diaphragm 16 is prevented from turning.

In these FIGS. 11A and 11B, these arrangements have been shown applied to the driving pulley 10A, but it is obvious, as will appear hereinafter, that they could also be applied to the driven pulley 10B. According to such arrangements at least one of the engagement members 22, and in practice each of them, comprises fastening means adapted to mesh with complementary fastening means provided on the movable side plate 14. In a first axial direction, fastening means couple the peripheral portion 17 of the diaphragm 16 to the movable side plate 14 when the latter is in a remote position with respect to the fixed side plate 12. Spacer means are provided between the central portion 18 of the diaphragm 16 and the movable side plate 14 for abutment, in the opposite axial direction, of said central portion 18 of the diaphragm 16 on said movable side plate 14 for its remote position.

In the illustrated embodiment, the means for fastening an engagement member 22 are constituted by a fastening shank 44 forming an extension of such an engagement member 22 in the direction of the movable side plate 14, in continuity with this engagement member 22. The complementary fastening means provided on the latter are constituted by an opening 45 which is disposed in registry in the peripheral rim 28 of the side plate 14 and in which said fastening shank 44 may be engaged.

The engagement member used may be of similar construction to one of those described hereinabove, particularly as regards means by which it fastens the peripheral portion 17 of the diaphragm 16.

In practice, in the embodiment shown in FIGS. 11a and 11B, the engagement member comprises on a first side of the diaphragm 16 facing the side plate 14 a median radial abutment portion 60, offset axially with respect to the diaphragm 16 by a spacer member 69 and thus forming weight member through which it is fitted on the diaphragm 16 secured by a screw 61. On the other side of the diaphragm 16, the engagement member comprises, in one piece, two lateral portions 62, which pass through passages in the diaphragm 16 and which abut against the peripheral portion 17 of the diaphragm.

In addition, in the embodiment shown, the thickness of the peripheral rim 28 of the side plate 14 is doubled internally and at right angles to each engagement member 22 by a reinforcement member 63. The reinforcement member is fixed by rivets 64 on the rim, and which comprises, opposite the opening 45 of the bar, the notches or opening means 29 by which the movable side plate 14 axially engages said engagement member 22.

In practice, the openings 46 have a circumferential extent greater than that of the notches or opening means 29 which, for their part, are adapted to the engagement member 22.

The spacer means comprise tongues 56, forming abutment projections, suitably cut out from the side plate 14 and bent substantially axially towards the diaphragm 16. Alternatively, such spacer means could be integrally formed with the engagement members 22, and comprise a substantially axial projection 66 of at least some of them or weight members with which they are fast, as shown schematically in broken lines in FIGS. 11A, 11B.

In the rest position, and therefore, in the case of the driving pulley 10A, for the close position of the movable side plate 14 with respect to the fixed side plate 12, the fastening shank 44 of the engagement members 22 is remote from the rim 28 of the movable side plate 14, and the tongues 56 of the latter are remote from the diaphragm 16.

The operation of the present speed change device is therefore as described hereinabove.

When, at high speed, the movable side plate 14 reaches its position spaced or remote from the fixed side plate 12, (FIG. 11B), the tongues 56 of this movable side plate 14 are in contact with the central portion 18 of the diaphragm 16 and hold said central portion in abutment against the abutment member 19. The fastening shank 44 of the engagement members 22, in the spaced or remote position of the movable side plate 14, comes into mesh in the corresponding openings 45 of the peripheral rim 28 thereof, so that the peripheral portion 17 of the diaphragm 16 is fixed to the movable side plate 14 by the fastening shank 44 of the engagement members 22 and therefore cannot move away from said peripheral rim 28 of the movable side plate.

In other words, the spacer means comprised of the tongues 56 of the movable side plate 14 act axially in one direction, and the coupling means comprised of the fastening shanks 44 of the engagement members 22 act axially in the opposite direction, in order, in combination, to prevent the diaphragm 16 from turning.

In the embodiment illustrated in FIGS. 11A and 11B, there is direct axial abutment of the peripheral portion 17 of the diaphragm 16 against the movable side plate 14.

On the contrary, wear parts 47 are fitted, according to the invention, on the ends of the radial fingers constituting the central portion 18 of the diaphragm, and also on the diaphragm where it bears on the abutment member 19.

In the embodiment shown, these wear parts 47 are comprised of simple plates secured individually on the radial fingers, by means of screws 61 which also fix the corresponding weight members 60, and secured for rotation on these radial fingers by an angle portion 48 bent at right angles against the end edge of the radial fingers.

A similar protection of the diaphragm 16 may be afforded at the axial abutment on the peripheral rim 28 of the diaphragm 14, for example, by means of suitable fingers integrally formed with the engagement members 22.

The protection of the diaphragm 16 thus ensured at each of its abutments makes it possible to avoid any particular treatment for surface hardening the diaphragm 16.

In practice, in the embodiment illustrated in FIGS. 11A and 11B, each engagement member 22 is carried by an abutment portion 60 forming a weight member and therefore forms a radial extension of such a weight member.

Figure 13:
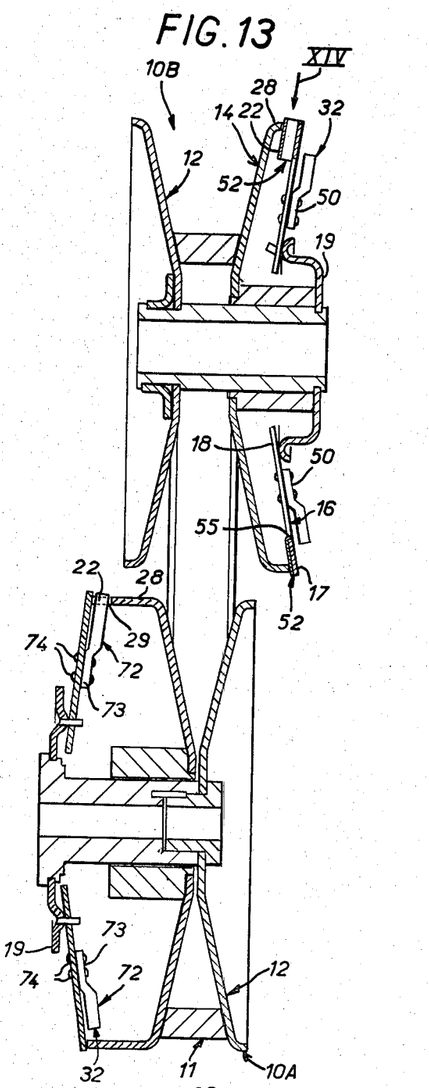
FIG. 13 is a view in axial section of another embodiment of a speed change device equipped with at least one pulley according to the invention.

The same applies in the case of the driving pulley 10A in the alternative embodiment illustrated in FIG. 13. On diaphragm 16 of this driving pulley 10A are fitted weight members 72 each of which accordingly comprises axially offset abutment portion 73 by which thay are secured on the diaphragm 16, for example by rivets 74, as shown. The engagement members 22 are formed by radial extensions of these weight members 72.

In fact, and as shown, not all the weight members 72 are necessarily sufficiently radially long enough to constitute engagement members 22.

In the embodiment shown, the driven pulley 10B comprises individual weight members 72 of the same type as those of the driving pulley 10A, but none of them also constitutes an engagement member.

Figure 14:
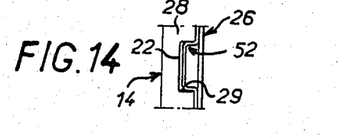
FIG. 14 is a partial side view of one of the pulleys of the speed change device, in the direction of arrow XIV of FIG. 13.

On the contrary, in this embodiment, at least some of the engagement members 22, and in practice all of them, are also part of a corrugated strip 52, fitted circumferentially on the peripheral portion 17 of the diaphragm 16, said strip being in contact with said peripheral portion 17 of the diaphragm 16, with its corrugations forming the engagement members 22.

Between its corrugations, the corrugated strip 52 has wear parts for the diaphragm 16, the axial abutment thereof against the movable side plate 14 being effected by this corrugated strip 52.

The corrugated strip may be maintained on the diaphragm 16 by any suitable means, for example, by welding.

However, as shown, it may suffice that, between its corrugations, the corrugated strip 52 is provided with portions 55 bent at right angles on the edge of the diaphragm 16 through the passages therein.

Of course, the present invention is not limited to the embodiments which have been described and shown, but covers any alternative embodiment and/or combination of their various elements.

In particular, the axial fingers 20 of an abutment members 19 could be received in passages in their radial fingers forming the central portion 18 of the diaphragm 16, rather than in the slots separating pairs of them.

What is claimed is:

1. A speed change pulley of the type comprising two oppositely and coaxially disposed side plates each having a frustoconical portion, one of said side plates being a movable side plate and the other of said side plates being a fixed side plate, said movable side plate being biased by resilient return means and mounted for axial movement relative to the fixed side plate, said resilient return means comprising an annular diaphragm having a peripheral portion which forms a resilient washer of the Belleville washer type and which is in abutment against said movable side plate and a central portion which is divided into radially extending fingers and which is in abutment against a component axially fast with said fixed side plate, at least one weight member projecting from said diaphragm for increasing the sensitivity of said diaphragm to centrifugal speed, and engagement means provided on said diaphragm cooperable with complementary opening means provided on the movable side plate, said engagement means comprising at least one engagement member constituting a component formed separately from said diaphragm and fitted thereon, characterized by said one engagement member being integral with said one weight member.

2. The speed change pulley of claim 1, wherein at least some of said engagement members together belong to the same corrugated strip fitted circumferentially on the peripheral portion of said diaphragm, said strip being between its corrugations in contact with said peripheral portion of said diaphragm and said corrugations forming said engagement members.

3. The speed change pulley of claim 1, wherein, for axial abutment of the peripheral portion of said diaphragm, said movable side plate comprises lugs formed by means of said opening means by which said movable side plate is engaged on the engagement members carried by said diaphragm.

4. The speed change pulley of claim 1, wherein the peripheral portion of said diaphragm is in axial abutment against said movable side plate through a ring.

5. The speed change pulley of claim 1, wherein, for axial abutment of the peripheral portion of the diaphragm, the movable side plate comprises a rim of rounded axial axial section.

6. The speed change pulley of claim 1, wherein said engagement means comprises both centering and torque transmssion means for said diaphragm in cooperation with said movable side plate.

7. The speed change pulley of claim 1, wherein said one engagement member comprises an extension in one-piece therewith forming said one weight member.

8. The speed change pulley of claim 7, wherein said extension forming said one weight member is spaced axially from a radial abutment portion thereof which is in contact with said diaphragm.

9. The speed change pulley of claim 8, wherein said extension forming said one weight member has the shape of a U of which one of the arms is in continuity with said radial abutment portion of said engagement member, making an angle therewith, and of which the other arm passes through said diaphragm and has its end bent into contact therewith.

10. The speed change pulley of claim 8, wherein said extension forming said weight member extends from the same side of said diaphragm as the radial portion of said engagement member and comprises a tongue which passes through said diaphragm and which, on its other side, is in contact with said diaphragm by at least the edge of the corresponding opening therein.

11. The speed change pulley of claim 8, wherein said extension forming said one weight member comprises one arm of a crook.

12. The speed change pulley of claim 11, wherein said extension forming said one weight member extends from the same side of said diaphragm as said radial abutment portion of said one engagement member, another arm of said crook forming said radial abutment portion.

13. The speed change pulley of claim 11, wherein said extension forming a said weight member extends from the other side of the diaphragm with respect to the radial abutment portion of this engagement member and comprises a tongue bent in contact with said diaphragm on said other side thereof.

14. The speed change pulley of claim 1, wherein said engagement member is carried by a said weight member.

15. The speed change pulley of claim 14, wherein said last mentioned engagement member forms a radial extension of said weight member which carries it.

16. The speed change pulley of claim 15, wherein said extension is spaced axially from the portion of said weight member by which the latter is in contact with said diaphragm.

17. The speed change pulley of claim 1, wherein, in combination, at least one of the engagement members comprises hook-like fastening means adapted to mesh with complementary fastening means provided on said movable side plate for coupling, in a first axial direction, the peripheral portion of said diaphragm to said movable side plate, when said movable side plate is in its position remote from said fixed side plate, and spacer means are provided between the central portion of said diaphragm and said movable side plate, for abutment, in the opposite axial direction, of said central portion of the diaphragm on said movable side plate for said remote position thereof.

18. The speed change pulley of claim 17, wherein said means fastening the engagement member are constituted by a fastening shank forming an extension towards said movable side plate, and complementary fastening means comprising an opening in said movable side plate in which said fastening shank may be received.

19. The speed change pulley of claim 17, wherein the spacer means are constituted by a substantially axial projection of a weight member forming an abutment projection.

20. The speed change pulley of claim 17, wherein the spacer means comprise by at least one cut-out tongue in said movable side plate substantially axially towards said diaphragm.

21. The speed change pulley of claim 1, wherein a wear part is fitted to the end of at least one of said radial fingers of said diaphragm.

22. The speed change pulley of claim 21, wherein, as the last mentioned radial finger carries a weight member the wear part connected thereto is fixed thereon by the same means which fix said weight member thereto.

* * * * *

UNITED STATES PATENT AND TRADEMARK OFFICE
CERTIFICATE OF CORRECTION

PATENT NO. : 4,365,963

DATED : December 28, 1982

INVENTOR(S) : Jacques J. M. Thirion de Briel

It is certified that error appears in the above-identified patent and that said Letters Patent is hereby corrected as shown below:

Title page:

[30] Foreign Application Priority Data

Change "May 7, 1978" to read -- July 5, 1978 --.

Signed and Sealed this

Fourth Day of April, 1989

Attest:

DONALD J. QUIGG

*Attesting Officer*   *Commissioner of Patents and Trademarks*